April 21, 1970    E. E. KWIERANT    3,507,247
COATING APPARATUS INCLUDING WORK-ACTUATED EXPANDABLE CHUCK
Filed May 2, 1966    6 Sheets-Sheet 2

INVENTOR.
ERNEST E. KWIERANT

Norbert P. Holler
ATTORNEY.

INVENTOR.
ERNEST E. KWIERANT

Norbert P. Holler
ATTORNEY.

April 21, 1970  E. E. KWIERANT  3,507,247
COATING APPARATUS INCLUDING WORK-ACTUATED EXPANDABLE CHUCK
Filed May 2, 1966  6 Sheets-Sheet 4
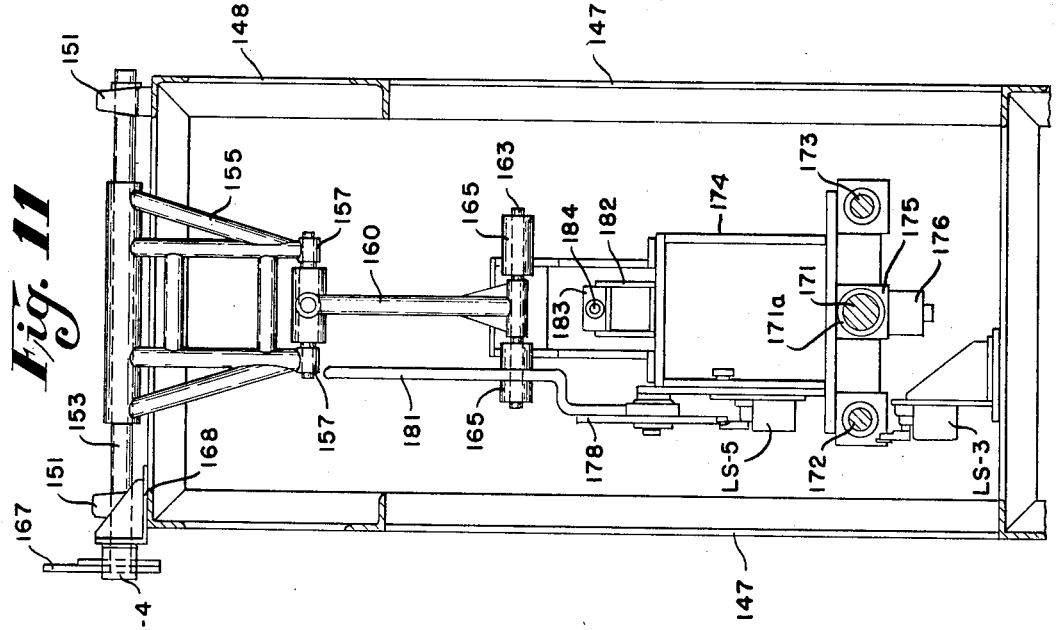
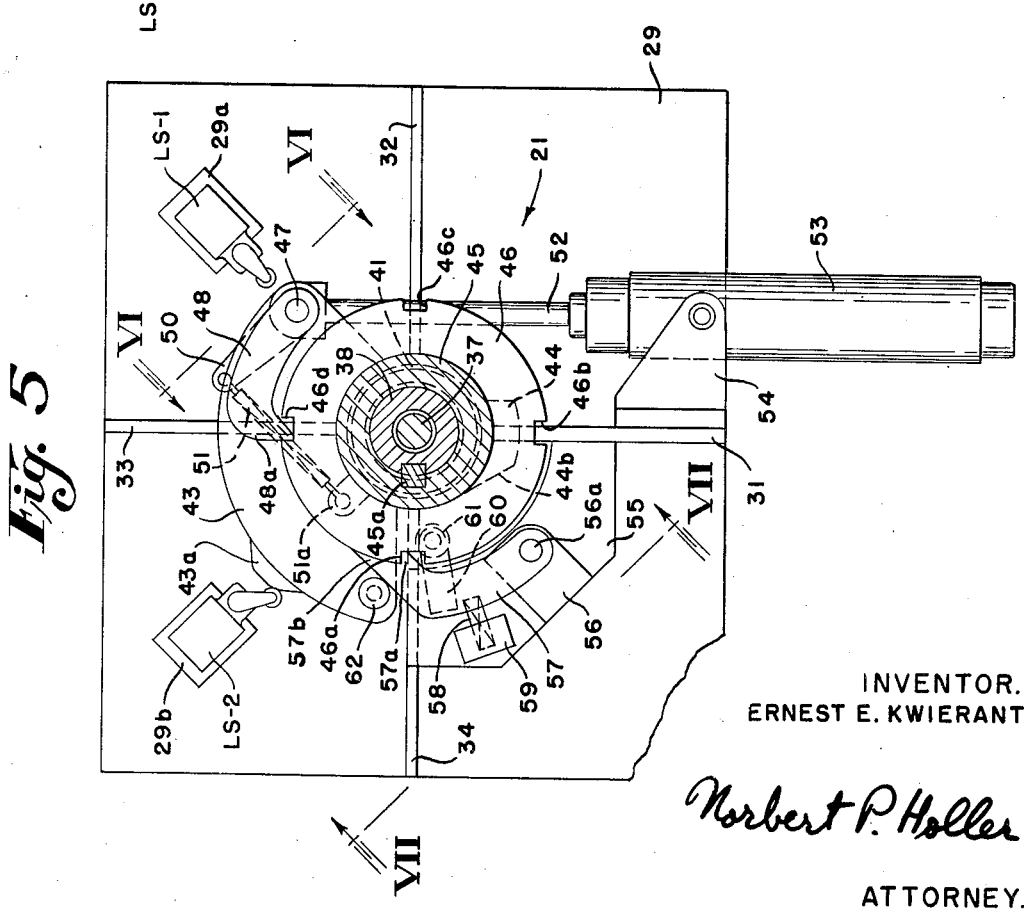
INVENTOR.
ERNEST E. KWIERANT
Norbert P. Holler
ATTORNEY.

INVENTOR.
ERNEST E. KWIERANT

Norbert P. Holler
ATTORNEY.

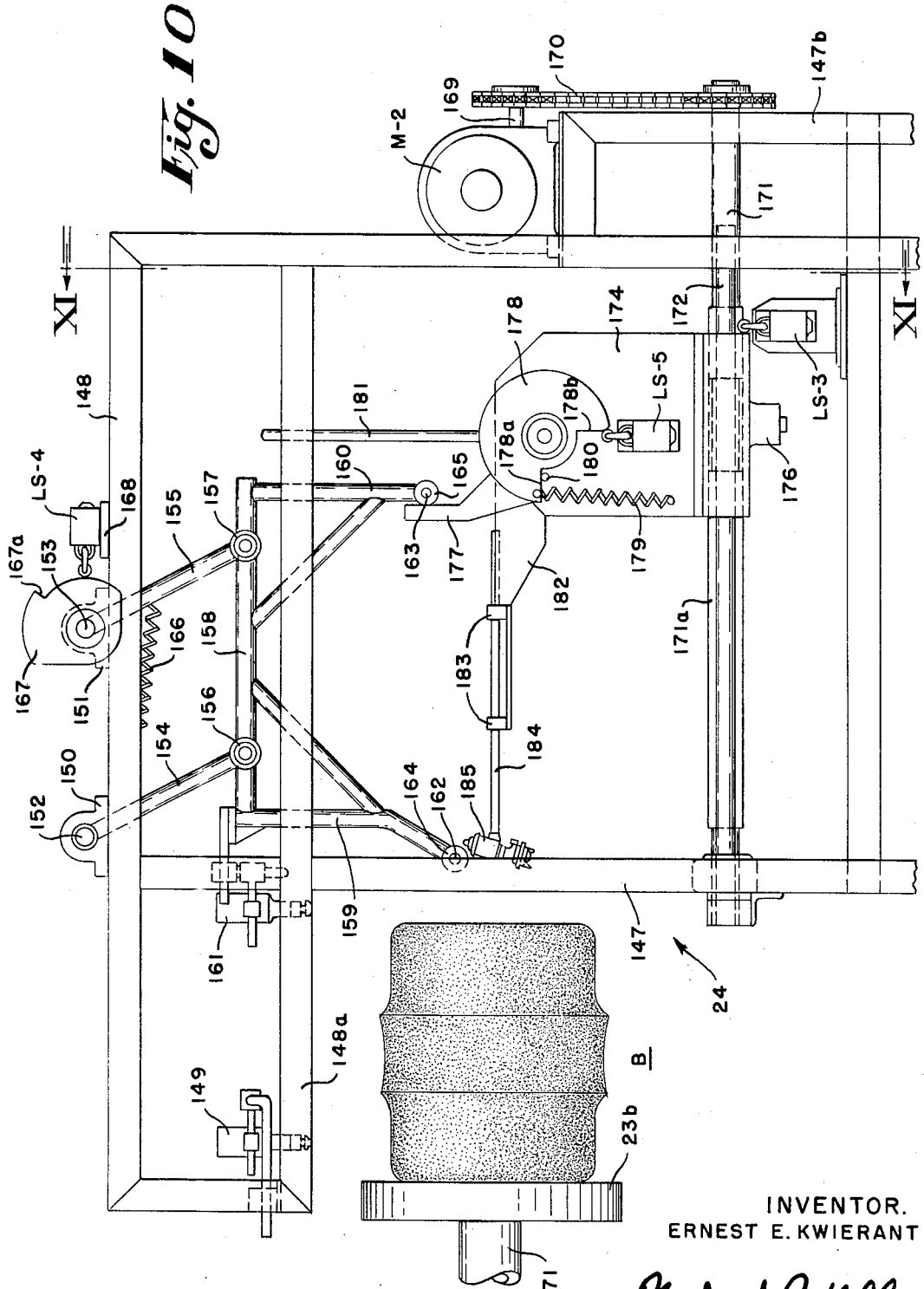

United States Patent Office 3,507,247
Patented Apr. 21, 1970

3,507,247
COATING APPARATUS INCLUDING WORK-ACTUATED EXPANDABLE CHUCK
Ernest E. Kwierant, Rochester, Mich., assignor to Uniroyal, Inc., a corporation of New Jersey
Filed May 2, 1966, Ser. No. 546,678
Int. Cl. B05c *11/14*
U.S. Cl. 118—4                                    5 Claims

ABSTRACT OF THE DISCLOSURE

A multi-station apparatus including a chuck for holding a rotating raw tire carcass as the same is moved successively through coating and drying zones. The chuck has an iris-like arrangement of pivotal gripping elements about which one end of the carcass can be telescoped, the gripping elements being adapted, when fanned outwardly, to engage the carcass from within and being actuated only when the surrounding carcass is pushed against an axially movable plate located behind the gripping elements hard enough to displace the plate rearwardly out of its normal position.

---

This invention relates to the art of tire manufacture, and in particular to the application of coating materials to the inside and outside surface areas of raw tire carcasses preparatory to the shaping and curing thereof.

The use of synthetic rubber compounds in the manufacture of tires has made it necessary to apply suitable coating materials to the rubber surfaces of the fabricated tire carcasses in order to insure the proper distribution of rubber during the curing operation and the production of finished tires with unblemished surfaces. These coatings are generally liquid in form and are known as lubricants and antiblemish paints, lubricant (one form of which, for example, consists of ground mica, clay, alcohol, water and silicone, with gasoline as a diluent) being applied to the interior surface or band ply of the carcass, and anti-blemish paint (one form of which, for example, consists of isoprene, carbon black, stearic acid, oils, antioxidant, accelerator and sulphur, with gasoline as a diluent) to the outer surface of the carcass in the sidewall areas. This gives rise to certain problems, since in coating carcasses with these materials, care must be taken that certain areas are not coated, and that the lubricant employed at the interior of the carcass does not reach any exterior surface of the carcass. Also, applying the coatings manually, by either brushing or spraying, for example, is time-consuming and laborious, while for automatic application of the coatings, the carcasses have to be sorted according to size and a separate applicator apparatus provided for each size. Irrespective of the procedure employed, moreover, defective tires are produced nevertheless, due to least in part to improper control of the coated areas and to the fact that the carcasses are placed on conveyors or trucks while still wet which permits the liquids to flow on the carcass surfaces.

It is an object of the present invention, therefore, to provide an apparatus for coating the inner and outer surfaces of raw tire carcasses, thereby to obviate the aforesaid problems and disadvantages.

Another object of the present invention is the provision of means enabling such coating operations to be carried out on tire carcasses of different sizes in continuous sequence without any need for adjustment of the apparatus to compensate for the variations in tire sizes.

It is also an object of the present invention to provide, in an apparatus of the aforesaid type, a novel carcass-holding chuck construction.

The foregoing and other objects, as well as the characteristics and advantages, of the present invention will be more clearly understood from the following detailed description thereof when read in conjunction with the accompanying drawings in which:

FIG. 5 is a similar sectional view, illustrating another operational stage of the carcass indexing mechanism;

FIG. 6 and 7 are, respectively, fragmentary elevational views taken along the lines VI—VI and VII—VII in FIG. 5;

FIG. 10 is an enlarged elevational view, taken along the line X—X in FIG. 1, of the spraying station of the apparatus according to the present invention; and FIG. 11 is a sectional view taken along the line XI—XI in FIG. 10.

GENERAL DESCRIPTION OF THE APPARATUS

Figure 1:
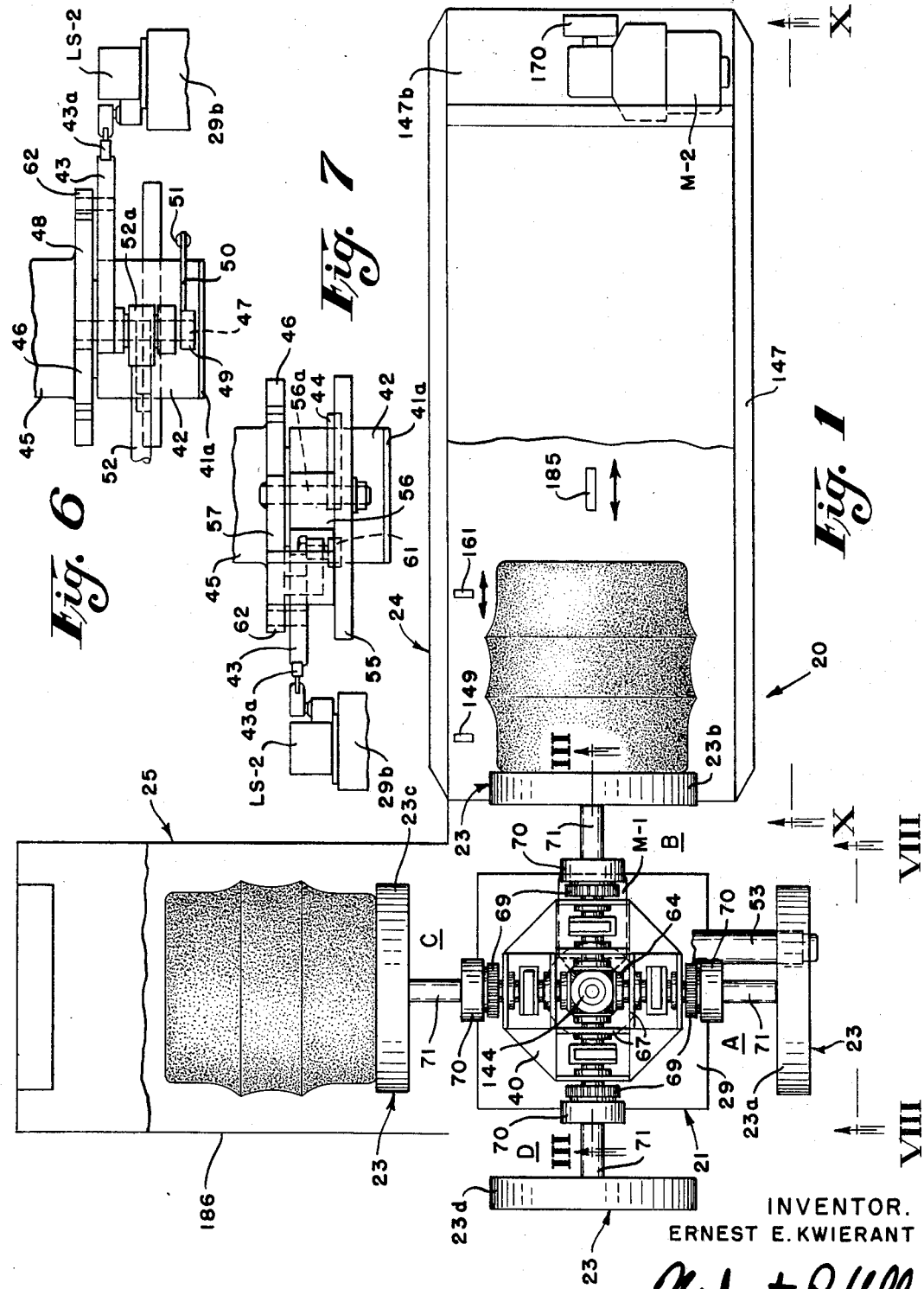
FIG. 1 is a diagrammatic plan view of a tire carcass-coating apparatus according to the present invention.
Figure 3:
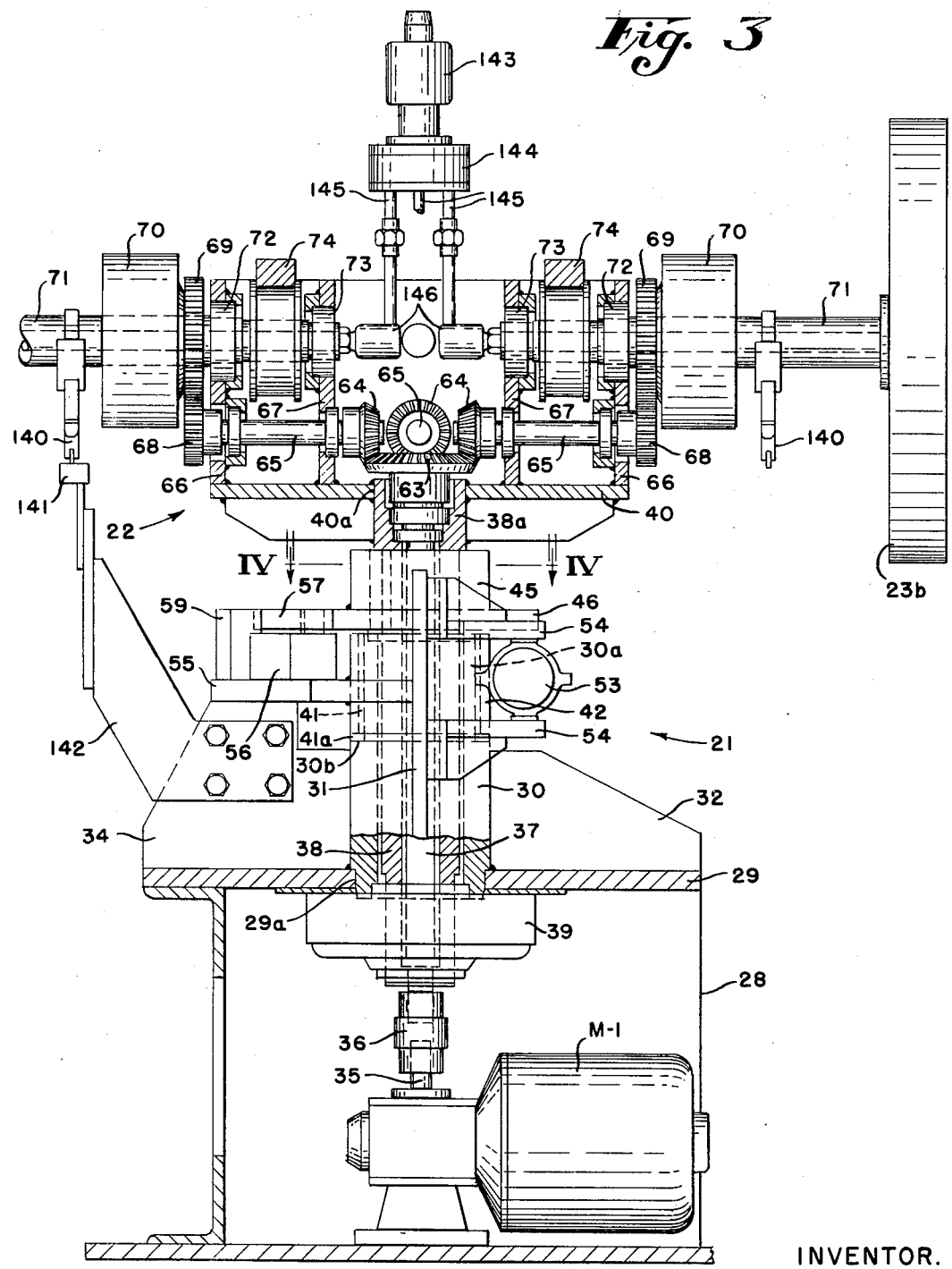
FIG. 3 is an enlarged fragmentary sectional view, partly in elevation, taken along the line III—III in FIG. 1.

As diagrammatically illustrated in FIG. 1, the lubricant and paint applying apparatus 20 according to the present invention comprises an indexing mechanism 21 for a turret structure 22 (FIG. 3) which supports four identical tire carcass-holding chucks 23. The mechanism 21 is arranged to index the turret and therewith the chucks sequentially through four stations A, B, C and D, at two of which (B and C) the apparatus is provided with a spraying arrangement 24 and a drying arrangement 25, respectively, and at one of which (D) the apparatus is associated with suitable means (not shown) for receiving coated carcasses from the apparatus. Suitable means (not shown) may also be provided to deliver uncoated carcasses to the fourth station (A). For ease of identification, the stations A, B, C and D will hereinafter generally be referred to, respectively, as the loading station, the spraying station, the drying station and the unloading station.

Figure 2:
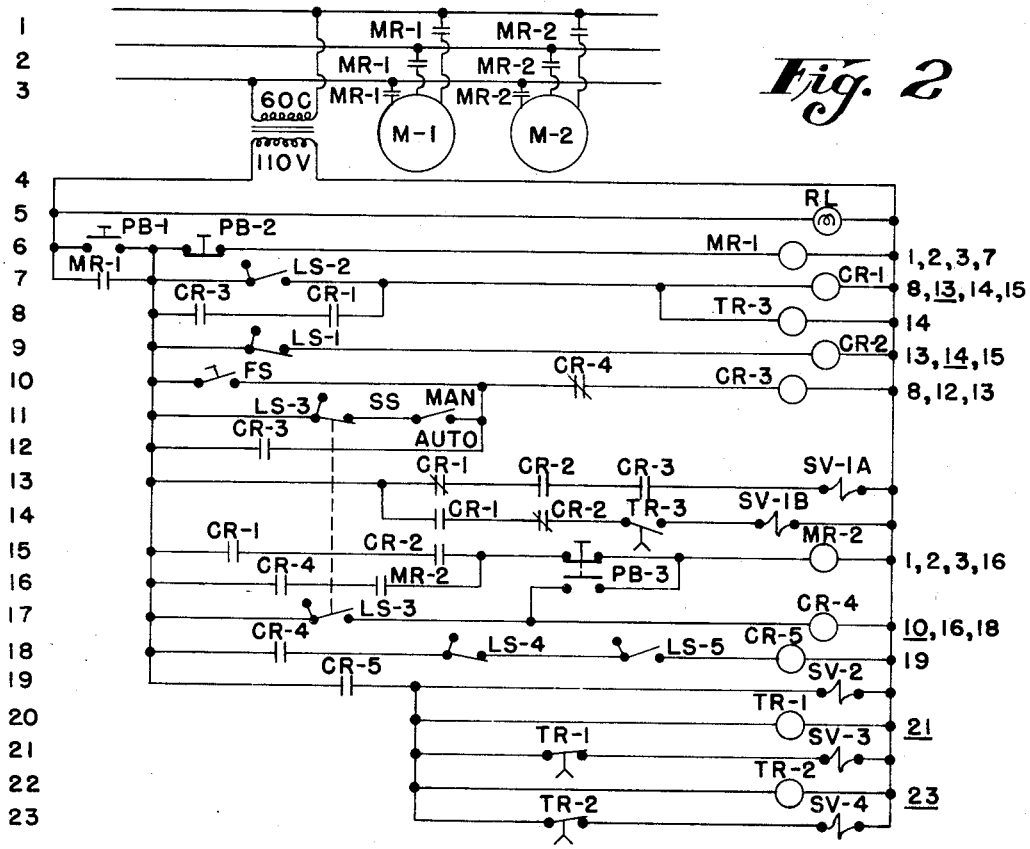
FIG. 2 is an electrical wiring diagram of the control circuit for the apparatus of the present invention.

In the following description, reference will be made, as necessary, to at least some of the various switches, relays and other electrical elements of the control circuitry for the apparatus, all of which elements are shown in FIG. 2 and some of which are also shown in one or more of the other figures. It appears advisable, therefore, briefly to refer to FIG. 2 at the present time and explain the notations employed therein.

The circuit has incorporated therein push button switches designated by the legends PB plus a number, limit switches designated by the legends LS plus a number, control relays designated by the legends CR plus a number, motor control relays designated by the legends MR plus a number, time delay relays designated by the legends TR plus a number, and solenoid valves designated by the legends SV plus a number. The contacts of the various relays (except for those of the time delay relays) are represented by small pairs of parallel lines, each such pair of lines per se designating a normally open set of contacts, and when traversed by a short diagonal line designating a normally closed set of contacts. The various contacts and switches are shown in the state when no power is applied to the circuit.

The vertical array of single number 1 to 23 at the left of FIG. 2 identifies the respective horizontal lines of the diagram in which the various circuit elements are arranged. The vertical array of single and multiple numbers at the right of FIG. 2 identifies the lines of the diagram in which the contacts of the various relays are to be found, plain numbers indicating normally open contacts, and underscored numbers indicating normally closed contacts. Merely to illustrate, in line 7 of the diagram (near the right end of the line) there is illustrated a circle designating the coil of control relay CR–1, and to the right of this line appear the numbers 8, 13, 14 and 15. This indicates that relay CR–1 has three sets of normally open contacts (which are found in lines 8, 14 and 15) and one set of normally closed contacts (which is found in line 13). The circuit also includes a momentary function switch FS (line 10), a "manual-automatic" selector switch SS (line 11), and a ready light RL (line 5).

THE INDEXING MECHANISM

Referring now in particular to FIGS. 3 to 7, the indexing mechanism 21 comprises a hollow base structure 28 (FIG. 3) adapted to rest on any suitable supporting surface (not shown) and having a top plate 29 which is provided with an opening 29a. Seated on the plate 29 within the confines of said opening is an upwardly extending tubular housing 30 which is welded to the plate 29 as well as to four vertical reinforcing plates 31 to 34. Located within the base structure 28 is an electric three-phase motor M–1 the output shaft 35 of which is drivingly connected via a coupling 36 to the lowermost end of a vertical shaft 37. The shaft 37 extends freely rotatably through a sleeve 38 which is in turn rotatably journaled in the housing 30 and extends beyond both ends of the latter. The lowermost end of the sleeve 38 is surrounded by a Fawick clutch brake 39 which is located in the base structure 28 at the underside of the plate 29. The sleeve 38 has an enlarged diameter top end section 38a which is welded to an indexing turret or table 40 within the confines of a central opening 40a of the latter. The interior of the sleeve section 38a receives and defines the bearing location for the uppermost end of the shaft 37.

Approximately midway of the length of the shaft 37, the housing 30 has an upper section 30a of reduced diameter so as to define an upwardly facing, annular, peripheral shoulder 30b (FIG. 3) on which rests the bottom flange 41a of a sleeve bearing 41 surrounding the said housing section 30a. Rotatably surrounding the bearing 41 is a sleeve 42 the uppermost edge of which is substantially coplanar with the top edges of the housing section 30a and sleeve bearing 41. Welded to the sleeve 42 and extending from approximately diametrically opposite sides thereof are (FIGS. 4 and 5) a substantially sector-shaped relatively large cam plate 43 and a relatively small cam plate 44. The cam plate 43 adjacent one of its corners carries a projecting cam 43a which is adapted to actuate a pair of limit switches LS–1 and LS–2 (lines 9 and 7 in the circuit diagram of FIG. 2) mounted by means of suitable brackets 29a and 29b on the top base plate 29.

Arranged about that portion of the sleeve 38 located between the top edge of the housing 30 and the bottom end of the enlarged sleeve section 38a is a sleeve 45 which has an annular flange 46 welded to its bottom end and is keyed to the sleeve 38 at 45a. The flange 46 is provided with four 90°-spaced notches 46a, 46b, 46c and 46d in its peripheral edge.

The cam plate 43 is further provided at that one of its corners remote from the cam 43a with an opening which rotatably receives a vertical rod 47. Fixed to the uppermost end of the rod 47 (FIGS. 4, 5 and 6) just above the cam plate 43 is an actuating pawl 48 the nose 48a of which is directed toward and in the plane of the horizontal flange 46 of the sleeve 45 and is adapted to enter the notches 46a to 46d in the flange. At its bottom end the rod 47 carries a bushing 49 from which extends an arm 50 to the free end of which is connected one end of a tension spring 51 the other end of which is anchored to a projection 51a secured to the sleeve 42, whereby the pawl 48 is continuously biased against the flange 46. Intermediate the cam plate 43 and the arm 50, the rod 47 is rotatably received in the head 52a of a piston rod 52 extending from a double-acting pneumatic cylinder 53 which is pivotally mounted between a pair of vertically spaced horizontal brackets 54 (FIG. 3) supported by the vertical reinforcing plate 31.

Rigidly mounted between and supported by the reinforcing plates 31 and 34 is a horizontal bracket or platform 55 on which is located a block 56 rotatably supporting by means of a rod 56a (FIG. 7) one end of a locking pawl 57. The pawl is biased toward the flange 46 by means of a spring 58 interposed between the pawl and a block 59 located on the platform 55. Adjacent its free end, the pawl 57 is provided with a projection 57a adapted to enter the notches 46a to 46d in the flange 46, and with a nose 57b adapted to engage the periphery of the flange 46. At its underside the pawl 57 carries an arm 60 which projects toward the sleeve 42 and at its free end carries a roller 61 adapted to be engaged by the cam plate 44. The cam plate 43 in addition carries a roller 62 at its corner adjacent the cam 43a which is adapted to engage the outer surface of the nose 57b of the pawl 57.

THE INDEXING TURRET

Referring now again to FIG. 3, it will be seen that the shaft 37 at its uppermost end just above the sleeve section 38a carries a horizontal bevel gear 63 which is in mesh at four circumferentially equally spaced locations with four vertical bevel gears 64 (only three are shown) carried by the innermost ends of respective horizontal shafts 65 rotatably journaled in respective pairs of vertical supports 66 and 67 welded to the turret table 40. At their outermost ends the shafts 65 carry respective pinions 68 which are in mesh with four spur gears 69 (seee also FIG. 1). These gears are fixedly connected to the housings of respective Fawick clutches 70 the inflatable inner members of which (not shown) are carried by four horizontal hollow shafts 71 which are rotatably journaled by means of pairs of bearings 72 and 73 in the upper regions of the pairs of supports 66–67 and extend freely rotatably through both the clutch housings and the gears. The shafts 71 at their outer ends carry the carcass-holding chucks 23, respectively, the structural details of which will be set forth presently. Intermediate its respective pair of bearings 72–73, each of the chuck shafts 71 is associated with a respective pneumatically operable brake 74.

THE CARCASS-HOLDING CHUCKS

The chucks 23 are all identical in every respect, and thus a detailed description of one of them will suffice for all.

Figure 8:
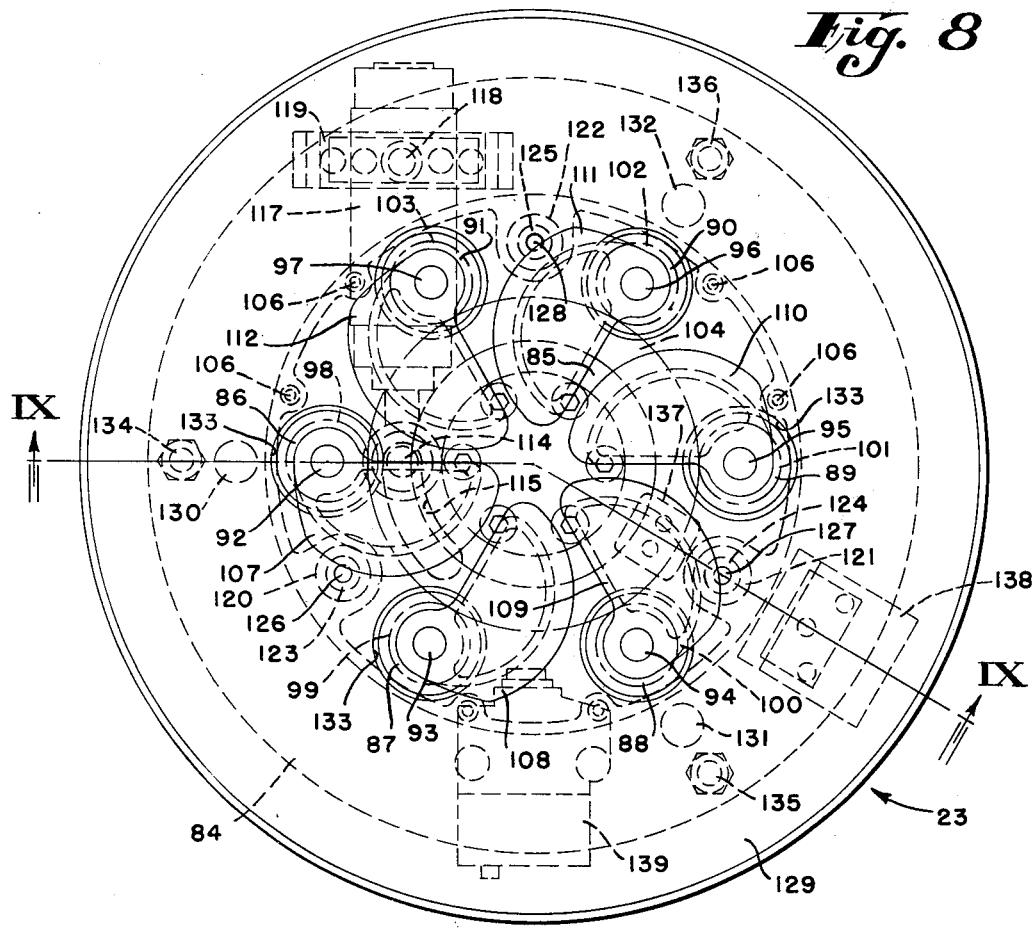
FIG. 8 is an enlarged elevational view, taken along the line VIII—VIII in FIG. 1, of a carcass holding chuck according to the present invention.
Figure 9:
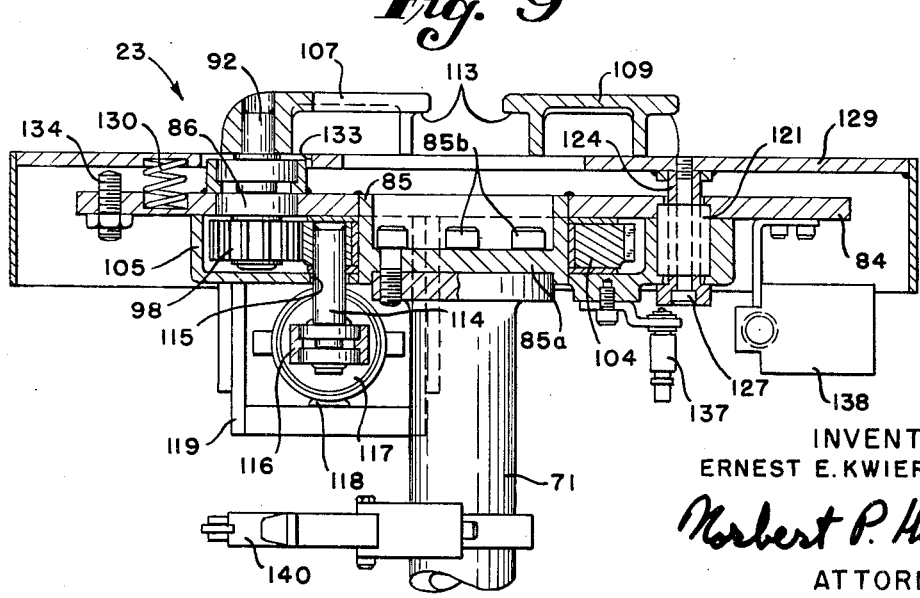
FIG. 9 is a sectional view taken along the line IX—IX in FIG. 8.

Referring now to FIGS. 8 and 9, it will be seen that the chuck comprises an annular plate 84 having a recessed central hub 85 the transverse web 85a of which engages and is secured to the outermost end of the shaft 71 by bolts 85b. The plate 84 carries six circumferentially spaced bearings 86 to 91 through which extend respective short shafts 92 to 97. At their innermost ends, the shafts 92 to 97 carry respective pinions 98 to 103 all of which are in mesh with an annular spur gear 104 rotatably surrounding the hub 85 of the plate 84. The gears 98 to 104 are enclosed within a housing 105 which is secured to the hub-side of the plate 84 by means of bolts 106 (FIG. 8).

At their outermost ends the shafts 92 to 97 carry respective approximately semicircularly contoured cams or grippers 107 to 112 each provided with a hub at one end welded to the said outermost end of its respective one of the shafts 92 to 97. The cams or gripping elements 107 to 112 when in their inactive positions have their straight sides oriented essentially radially of the plate 84 (see FIG. 8), with their ends remote from the hubs circumferentially overlying the hub 85. Each of the gripping elements also is flanged along its arcuate edge, as indicated at 113 in FIG. 9 for the gripping elements 107 and 109.

From the foregoing it will be understood that rotation of the gear 104 in one direction or the other will cause the elements 107 to 112 to execute angular or rotary movements about the axes of their respective shafts 92 to 97 in the manner of an iris of a camera. To effect such rotation of the gear 104, a pin 114 is welded or otherwise fixedly secured to the gear 104 and extends therefrom in the direction away from the plate 84 and through an arcuate slot 115 defined in the housing 105. Articulated to the free-end of the pin 114 in any suitable manner is the head 116 of a piston rod extending slidably from a double-acting pneumatic cylinder 117 pivotally mounted at 118 in a supporting frame 119 affixed to the housing 105. Protraction of the piston rod from the cylinder 117, therefore, rotates the gear 104 in a counterclockwise direction as seen in FIG. 8 which in turn causes the pinions 98 to 103 to be rotated so as to swing the gripping elements 107 to 112 clockwise about their respective axes 92 to 97, the stroke of the piston rod and thus the extent of the angular displacement of the gripping elements out of their positions illustrated in FIG. 8 being limited by the length of the arcuate slot 115. The functioning of the elements 107 to 112 at the outer positions will be more fully explained presently.

At three equally spaced locations, the housing 105 carries bearings 120, 121 and 122 in which are slidably journaled sleeves 123, 124 and 125. Secured to the outermost ends of the sleeves 123 to 125 by means of bolts 126, 127 and 128 extending therethrough is an annular front plate 129 which is normally biased away from the plate 84 (to the extent permitted by the heads of the bolts 126 to 128) by means of compression springs 130, 131 and 132 interposed between the plates. The front plate 129 is further provided with a plurality of openings 133 accommodating the bearings 86 to 91, respectively, and movement of the plate 129 toward the plate 84 is limited by adjustable abutment screws 134, 135 and 136 carried by the plate 84.

The housing 105 further carries a pneumatic poppet valve 137 which is adapted, when actuated, to operate an air switch or limit valve 138 carried by the plate 84 so as to cause air to be bled from the rod-end of the cylinder 117 and pressure admitted into the blind end of the cylinder, for swinging the gripping elements outwardly. A Ross three-way sequence valve or air timer 139 is also supported by the plate 84 for a purpose to be more fully described presently. Mounted on each of the chuck shafts 71 is a "Numatic" three-way poppet valve 140 (see also FIG. 3) in position to be actuated by a cam 141 mounted on a bracket 142 secured to the vertical reinforcing plate 34 at the station D, the valve 140, when actuated, operating the limit valve or switch 138 to bleed pressure from the blind end of the cylinder 117 and admit pressure into the rod end of the cylinder. Air for the operation of the various pneumatic components of the apparatus is derived from a compressor (not shown) communicating through a rotary seal 143 with a manifold 144 which in turn communicates via ducts 145 and rotary seals 146 with the respective interiors of the chuck shafts 71.

Briefly, therefore, it will be understood that ordinarily, i.e. in the absence of any tire carcasses, when the motor M–1 is running, the shafts 37 and 65, the gears 68 and 69, and the housings of the Fawick clutches 70 are all rotating. The shafts 71 and the chucks 23 remain stationary, however, since the clutches are disengaged while the brakes 74 are activated. If a tire carcass is now pushed endwise against the front plate 129 of a chuck, with the bead of the carcass encircling the locus of the hubs of the gripping elements 107 to 112, the displacement of the plate 129 against the force of the springs 130 to 132 actuates the associated poppet valve 137 and therethrough the limit valve 138 to cause pressure to be admitted into the blind end of the cylinder 117. This causes the gripping elements to be swung outwardly from their positions illustrated in FIG. 8 until their arcuate edges engage the interior surface of the carcass just inside the bead which is thus confined in the space defined between the depressed front plate 129 and the flanges 113 of the gripping elements. During this time, the sequence valve or timer 139 provides a time delay so that the chuck does not immediately start rotating. After the pre-set time interval has lapsed, with the chuck properly loaded, the timer 139 associated therewith operates to channel compressed air so as to deactivate its respective brake 74 and engage its respective one of the clutches 70, whereby the chuck is set into rotation. Such rotation then continues until the associated valve 140 (FIG. 3) is actuated by the cam 141, upon arrival of the loaded chuck at the station D, whereby the gripping elements are swung back into their inactive positions, which releases the tire carcass and permits the plate 129 to return to its normal position illustrated in FIG. 9, and also releases the clutch and reactivates the associated brake to stop the rotation of the chuck.

THE SPRAYING ARRANGEMENT

Referring now in particular to FIGS. 10 and 11, the spraying arrangement 24 comprises a rigid metal framework 147 having a superstructure 148 a part 148a of which overhangs the station B and at its frontwardmost end supports a stationary, manually adjustable spray nozzle 149. Mounted atop the superstructure 148 are two pairs of bearing blocks 150 and 151 in which are rotatably journaled respective pivot shafts 152 and 153. Depending downwardly from the shafts 152 and 153, respectively, are two tubular steel arm structures 154 and 155 the lowermost extremities of which are pivotally connected through pairs of bushings or bearings 156 and 157 to a tubular steel frame 158 having downwardly depending front and rear legs 159 and 160. At its front end, the swingable frame 158 carries an adjustable spray nozzle 161, and at the lower extremities of the legs 159 and 160 are provided laterally extending pins or cross-shafts 162 and 163 on which are rotatably supported axially spaced pairs of rollers 164 and 165. The frame 158 is generally biased toward the front of the framework 147, i.e. toward station B, through the intermediary of a spring 166 (not shown in FIG. 11) one end of which is anchored to the superstructure 148 and the other end of which is anchored to the rear pivot arm structure 155. At one end, the shaft 153 carries a cam 167 which is adapted to actuate a limit switch LS–4 (line 18 in the circuit diagram of FIG. 2) mounted on the superstructure 148 by means of a bracket 168.

Rigidly mounted on a rear extension 147b of the framework 147 is an electric three-phase motor M–2 the output shaft 169 of which is drivingly connected through a sprocket chain 170 or like transmission means to the rear end of a ratchet shaft 171 extending horizontally toward the front of the framework 147 and rotatably journaled therein. Suitably supported at the opposite sides of the ratchet shaft 171 are respective guide or traverse rods 172 and 173 which support a carriage 174 for linear reciprocal sliding movement therealong between the front and rear ends of the framework 147. The carriage 174 is provided with a downwardly depending bushing 175 through which the track portion 171a of the ratchet shaft 171 extends, the bushing 175 carrying a follower 176 an upwardly projecting tooth or finger of which (not shown) engages and rides in the tracks of the ratchet shaft 171 to transform the rotary motion of the latter into linear reciprocal motion of the carriage 174 in a well known manner. When at the rear end of its path of travel, the carriage 174 actuates a limit switch LS–3 into the state illustrated in lines 11 and 17 in the circuit diagram of FIG. 2.

The carriage 174 has an upwardly extending arm structure 177 the sides of which are located just frontwardly of the rollers 165 carried by the rear leg 160 of the swing frame 158, the spring 166 thus maintaining the rollers 165 in engagement with the rear side of the arm structure 177. Rotatably mounted on the carriage 174 at one side thereof is a cam 178 which is connected to one end of a spring 179 the other end of which is anchored to the carriage. The spring normally maintains the cam edge 178a in engagement with a small stop abutment pin 180 projecting from the carriage. The other cam edge 178b is adapted to actuate a limit switch LS–5 (line 18 in the circuit diagram of FIG. 2) supported by the carriage 174.

Welded to the periphery of the cam 178 and extending upwardly therefrom to the rear of one of the rollers 165 is an arm 181. The carriage 174 is further provided with a frontwardly extending arm structure 182 having bearings 183 in which is adjustably arranged a rod 184. The rod 184 carries a spray nozzle 185 at its front end substantially axially aligned with the rest position of a chuck and associated chuck shaft at the station B.

THE DRYING ARRANGEMENT

The drying arrangement 25 (station C) comprises an enclosure 186 which is disposed at right angles to the framework 147 and houses a forced-air drying oven (not shown) of any suitable construction designed to direct heated air against the wet spray-coated surfaces of a tire carcass indexed to the station C from the spraying station B. Further reference will be had to this part of the present invention in the description of the operation of the apparatus.

OPERATION

Figure 4:
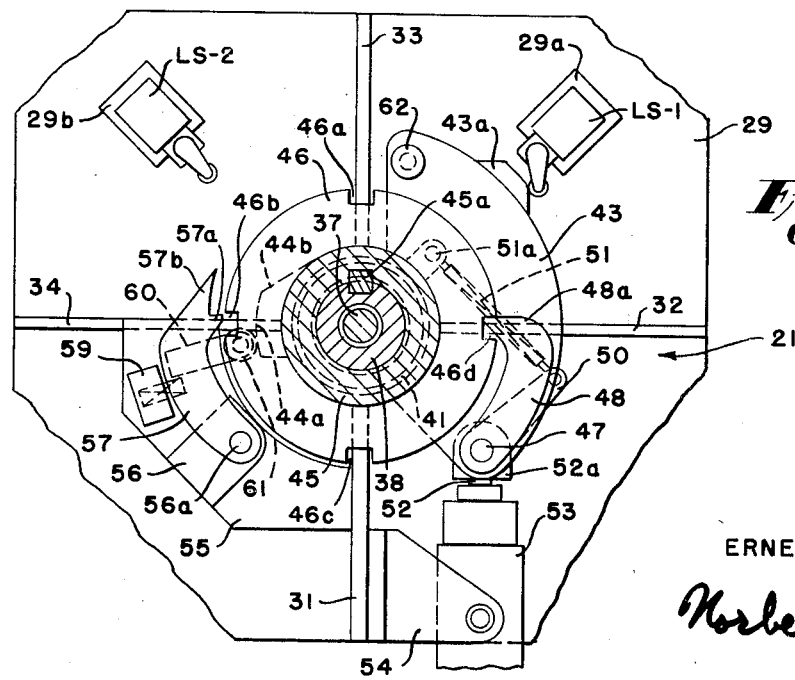
FIG. 4 is a sectional view taken along the line IV—IV in FIG. 3 and illustrates the carcass indexing part of the apparatus in one stage of operation thereof.

The operation of the anti-blemish paint and lubricant applying apparatus according to the present invention is as follows:

As starting condition, it is assumed that the apparatus in general is in active, i.e. there are no tire carcasses supported by any of the chucks, each of the chucks is in the condition illustrated in FIGS. 8 and 9, the indexing mechanism is in the condition illustrated in FIG. 4, and the carriage 174 is in its rearwardmost position illustrated in FIG. 10. Thus, limit switch LS–1 (line 9 in FIG. 2) and limit switch LS–4 (line 18) are closed, and limit switch LS–3 is actuated to open the contacts thereof in line 17. Limit switches LS–2 (line 7) and LS–5 (line 18) are open. The first manner of operation to be described is manual, and thus the selector switch SS (line 11) is open in its "MAN" position as shown.

To start the apparatus, if the ready light RL (line 5) is lit to indicate that power has been applied to the circuit, the operator closes the momentary push button switch PB–1 (line 6) which energizes the motor control relay MR–1 to close the four normally open sets of contacts of this relay located in lines 1, 2, 3 and 7. As a result, the motor M–1 is started due to the closing of the sets of contacts of MR–1 in lines 1, 2 and 3, while at the same time the closing of the contacts of MR–1 in line 7 completes a holding circuit for the relay MR–1 through the normally continuously closed push button switch PB–2. The main chuck drive shaft 37 thus is set into rotation which, as previously described, causes the gears 69 and therewith the housings of the clutches 70 to rotate, but since at this time the clutches are not engaged, the chuck shafts 71 remain stationary and do not rotate.

Under these conditions, therefore, control relay CR–2 (line 9) is energized to close the sets of contacts thereof in lines 13 and 15 and open the set of contacts in line 14, and control relays CR–1, CR–3, CR–4 and CR–5 are deenergized.

The operator now loads a tire carcass onto that one of the chucks 23 then located at the station A, e.g. the chuck designated 23a in FIG. 1, in the manner hereinbefore described, upon completion of which operation the loaded chuck starts to rotate, for example at a speed of about 85 r.p.m. which has been found suitable for the purposes of the present invention, due to the deactivation of its respective brake 74 and engagement of its respective clutch 70. Once this has taken place, the operator actuates the momentary function switch FS (line 10) to close the same, whereby control relay CR–3 is energized through the normally closed set of contacts of control relay CR–4 in line 10. With CR–3 energized, the set of contacts thereof in line 12 is closed to complete a holding circuit for CR–3 so as to maintain the same energized even though the switch FS opens as soon as pressure thereon is released by the operator.

At the same time, since control relay CR–2 is energized by virtue of the actuation of limit switch LS–1 by the cam 43a, so that the normally open set of CR–2 contacts in line 13 are also closed, the closing of the normally open set of contacts of CR–3 in line 13 completes the energization circuit for the solenoid valve SV–1A. This effects the admission of pressure into the blind end of the cylinder 53 to cause the piston rod 52 thereof to be advanced. With the flat leading edge of the nose 48a of the indexing pawl 48 engaging the leading flat side of the notch 46d in the flange 46, this movement of the piston rod effects a 90° rotation of the flange 46 and sleeve 45 from the position thereof shown in FIG. 4 to the position shown in FIG. 5, such movement being permitted since at the start thereof the roller 61 connected with the locking pawl 57 is in engagement with the outermost dwell portion 44a of the surface of the cam 44 and rides therealong, so that the projection 57a of the pawl 57 cannot enter the notch 46b. After a certain amount of rotation, of course, the roller 61 comes in contact with the slanted portion 44b of the surface of the cam 44, but this has no immediate effect since at that time the tip of the projection 57a engages the outermost periphery of the flange 46. As soon as the notch 46a reaches the location of the pawl 57, however, the projection 57a thereof is snapped into said notch, bringing its flat face into engagement with the trailing flat side of the notch 46a, as shown in FIG. 5, so that further rotation of the flange 46 and parts connected therewith is inhibited.

Concurrently with the foregoing, the outward movement of the piston rod 52 causes the cam plate 43 to be displaced out of its position illustrated in FIG. 4. The cam 43a thus releases limit switch LS–1 to open the same, whereby control relay CR–2 is deenergized, reopening the sets of contacts thereof in lines 13 and 15 and reclosing the set of contacts thereof in line 14. As the cam plate 43 reaches its position shown in FIG. 5, corresponding to a full 90° indexing of the turret table 40 to position the loaded chuck at station B, where it is designated 23b in FIGS. 1, 3 and 10, the roller 62 engages the nose 57b of the pawl 57 to hold the latter against accidental movement away from the flange 46, and the cam 43a actuates the limit switch LS–2 to close the same, whereby control relay CR–1 is energized, closing the normally open sets of contacts thereof in lines 8, 14 and 15 and opening the normally closed set of contacts thereof in line 13, while at the same time the brake 39 (FIG. 3) is activated to lock the sleeve 38 and the turret parts connected therewith against further rotation. With the set of contacts of CR–3 in line 8 still closed, time delay relay TR–3 is energized. Since the normally closed contacts of CR–1 in line 13 are now open, solenoid valve SV–1A is deenergized, which stops the admission of pressure into the blind end of the cylinder 53 but has no other effect. After passage of the time interval for which TR–3 has been set, however, the contacts thereof in line 14 close, completing the energization circuit for the solenoid valve SV-1B which effects the admission of pressure into the rod end of cylinder 53 to cause the piston rod 52 to be retracted. During this movement the flange 46 remains stationary, since the pawl 48 is able to ride out of the notch 46d in which it was previously engaged due to the provision of the slanted rear face on its nose 48a.

As the cam plate 43 is retracted, limit switch LS-2 is again released by the cam 43a, but control relay CR-1 remains energized through its holding circuit including the still closed MR-1 contacts in line 7 and the still closed CR-3 and CR-1 contacts in line 8. Immediately thereafter, limit switch LS-1 is reactuated by the cam 43a to again energize control relay CR-2. With both CR-1 and CR-2 energized, the respective normally open sets of contacts thereof in line 15 are both closed. The carriage motor control relay MR-2 thus is energized to close the normally open sets of contacts thereof in lines 1, 2 and 3 to start the carriage motor M-2 to advance the carriage 174 from its position illustrated in FIG. 10 toward the front of the framework 147. As the carriage leaves its starting position, the limit switch LS-3 is released to permit the contacts thereof in line 17 to close, whereby control relay CR-4 is energized to close the normally open set of contacts thereof in lines 16 and 18. The closed CR-4 contacts in line 16 together with the now closed set of contacts of the motor control relay MR-2 in line 16 complete a holding circuit for MR-2 and insure that the motor M-2 remains in operation as long as the line 17 contacts of LS-3 are closed. Concurrently, the opening of the normally closed set of contacts of CR-4 in line 10 breaks the energization circuit for relay CR-3, the deenergization of which then effects the deenergization of relay CR-1 through the reopening of the CR-3 contacts in line 8.

As the carriage 174 advances, the swing frame 158 follows and also moves toward the free end of the rotating tire carcass supported by the chuck 23a, under the action of the spring 166 on the pantograph arm arrangement 154–155. When the rollers 162 carried by the spring frame 158 contact the said end, i.e. the free bead, of the carcass, the frame stops moving, and the adjustment of the nozzle 161 carried thereby is such that it is at this time located opposite the outer sidewall region of the carcass. The nozzle 149 was previously adjusted to be opposite the inner sidewall region of the carcass, the terms "inner" and "outer" being used with reference to the chuck. The carriage 174 continues to move, however, to cause the nozzle 185 to enter into the confines of the carcass. Very shortly after the frame 158 stops moving, therefore, the arm 181 engages one of the rollers 165 at the rear of the frame 158, whereby the cam 178 is displaced in a clockwise sense as seen in FIG. 10 so as to cause its edge 178b to actuate limit switch LS-5 and close the same. This permits control relay CR-5 (line 18, FIG. 2) to be energized since at this time the set of contacts of CR-4 in line 18 are closed while limit switch LS-4 is also closed, not having been actuated by the cam 167.

With CR-5 energized, the set of contacts thereof in line 19 close, energizing the two time delay relays TR-1 and TR-2 in lines 20 and 22, respectively, and the solenoid valves SV-2, SV-3 and SV-4 in lines 19, 21 and 23, respectively. The actuation of these valves effects actuation of the nozzles 185, 149 and 161, respectively, whereby anti-blemish paint is sprayed against the two sidewall regions of the outer surface of the tire carcass while lubricant is sprayed against the inner surface of the tire carcass. After the time interval for which the time delay relays TR-1 and TR-2 have been set has passed, the contacts thereof in lines 21 and 23, respectively, open to deenergize the solenoid valves SV-3 and SV-4 and terminate the spraying action of the nozzles 149 and 161. The internal nozzle 185 is not time-controlled and continues to operate as the carriage completes its advance to the end of its frontward movement (as determined by the ratchet shaft 171) and begins to return. Shortly before the nozzle 185 leaves the confines of the tire carcass and before the arm structure 177 reengages the rollers 165 on the rear leg 160 of the swing frame 158, the arm 181 returns to its illustrated position under the action of the spring 179 on the cam 178, whereby LS-5 is released to open the same and deenergize control relay CR-5, which causes the contacts of the latter in line 19 to open and deenergize the solenoid valve SV-2, thereby to terminate the spraying action of the nozzle 185.

When the carriage has fully returned to its starting position, limit switch LS-3 is again actuated to open the contacts thereof in line 17 and thereby to deenergize control relay CR-4. This opens the set of contacts thereof in line 16, breaking the energization circuit for the carriage motor control relay MR-2, whereby the contacts thereof in lines 1, 2 and 3 are opened to stop the motor M-2. When the operator now again actuates the momentary switch FS, the hereinbefore described indexing cycle of operations is repeated to cause the sprayed tire carcass to be indexed to the drying station C where, while still rotating with the chuck (now designated 23c in FIG. 1), it is subjected to the action of the hot air drying oven. The liquid coatings thus are dried in situ, i.e. while the carcass is still horizontally disposed, without being permitted to migrate either axially along or circumferentially about the surfaces of the carcass.

After the drying cycle has been completed, the operator again actuates the function switch FS which again initiates the indexing operation bringing the now dried tire carcass to the unloading station D. As the carcass reaches the unloading station, still rotating with the chuck (now designated 23d), the associated poppet valve 140 is actuated by the cam 141 (FIG. 3), causing the air supply to the chuck and to the associated clutch to be interrupted. The clutch thus is disengaged and the respective brake 74 reactivated, causing the chuck to stop rotating, and the cylinder 117 is at the same time actuated so as to retract its piston rod and return the pin 114 to its starting position in the arcuate slot 115 shown in FIG. 8. The resultant clockwise rotation of the gear 104 thus again returns the gripping elements 107 to 112 to their illustrated positions, withdrawing the flanges 113 thereof from the inside of the held bead of the tire carcass. The latter is thus released to drop off onto any suitable receiving structure, e.g. a table or a conveyor (not shown) from which it may be removed for storage prior to the subsequent shaping and curing operations.

It will be understood, of course, that in the ordinary course of events the apparatus will not be run for just one tire, as hereinbefore described, but will have a number of carcasses processed thereby in a more or less continuous stream. Accordingly, following the first indexing cycle to shift the first loaded chuck to the spraying station B, the operator will generally load another carcass onto the empty chuck which has newly arrived at the loading station A, so that when the switch FS is again actuated and the next indexing cycle is initiated to shift the sprayed carcass to the drying station C, the uncoated and newly loaded carcass is shifted to the spraying station while another empty chuck arrives at the loading station, whereupon the next indexing cycle moves the then newly loaded chuck to the spraying station, the just coaed carcass to the drying station, and the dried carcass to the unloading station, etc.

For automatic operation, the selector switch SS (line 11) is initially shifted to its "AUTO" position, i.e. closed, whereby control relay CR-3 is energized independently of the function swtich FS each time and whenever control relay CR-4 is deenergized. The various indexing operations thus will follow in sequence one after the other without further attention by the operator and independently of whether or not carcasses are loaded onto the chucks as they arrive at the loading station, since the contacts of LS-3 in line 11 will be closed every time the carriage 174 returns to its starting position shown in FIG. 10 which concomitantly opens the contacts of LS-3 in line 17 and thereby deenergizes CR-4 to close the set of contacts thereof in line 10. Other than this, the operation of the system is precisely the same as hereinbefore described.

Inasmuch as especially in the automatic operation of the apparatus it is possible that empty chucks will be indexed to the spraying station, for example if the operator is inattentive or for some other reason is unable to properly mount a fresh tire carcass on the empty chuck at the loading station before the next indexing cycle is initiated, a safety feature has been incorporated in the apparatus to prevent needless actuation of the spray nozzles. Thus, when a chuck is indexed to the spraying station without any tire carcass mounted thereon, the frontward movement of the swing frame 158 is not arrested as before but tends to continue to the extent that the pantograph linkage permits. Were this point to be reached, further advance of the carriage 174 would soon bring the arm 181 against the associated roller 165 which in turn would cause the arm 178 to be shifted as described to actuate the switch LS-5, whereby energization of relay CR-5 and consequent actuation of the sprays would follow. This potential drawback is avoided by virtue of the fact that the cam 167 on the pivot shaft 153 (FIG. 10) is so set that, if the travel of the swing frame 158 continues beyond that predetermined point where the outer bead of the smallest tire carcass to be sprayed would normally be located, the leading edge 167a of the cam 167 travels far enough to actuate the limit switch LS-4 and open the same before switch LS-5 is actuated by the cam 178, thereby preventing both the energization of control relay CR-5 and the actuation of the nozzles 185, 149 and 161 even though, after the frame has come to a stop, the continued movement of the carriage will nevertheless cause LS-5 to be actuated as previously described.

It should also be noted that the apparatus according to the present invention is inherently adapted for the processing of tire carcasses of a variety of nominal tire sizes. Thus, the lengths of the slots 115 in the housings 105 carried by the chuck plates 84 can be predetermined to ensure that the gripping elements 107 to 112 can swing out far enough to engage the largest diameter tire beads to be handled; the cam 167 can be set (as previously indicated) to actuate the limit switch LS-4 only if the rollers 164 of the swing frame 158 travel beyond the vertical plane where the free bead end of the shortest tire carcass to be handled would be located i.e. if the said rollers come too close to the front plate of the chuck; and the nozzles 149, 161 and 185 can be adjusted in dependence on the lengths of the tire carcasses to be handled and the widths of the surface areas to be sprayed. This applies especially to the nozzles 149 and 161, the former of which can be adjusted relative to the plane of the chuck, and the latter of which can be adjusted relative to the rollers 164. Accordingly, even if any given batch of carcasses to be coated includes carcasses of different nominal sizes not arranged in any prescribed sequence, as long as such sizes fall within the range of sizes for which the apparatus has been set, the apparatus will function perfectly and automatically without any need for readjustment and without any need for special apparatus to accommodate each different tire size.

Having thus described my invention, what I claim and desire to protect by Letters Patent is:

1. A chuck for holding a raw tire carcass, comprising a rear plate, a circumferentially apertured front plate carried by said rear plate outwardly thereof for limited linear reciprocal movement toward and away therefrom, biasing means for normally urging said front plate away from said rear plate, a plurality of rotatable stub shafts supported by said rear plate and extending outwardly therefrom through said apertures in said front plate, a like plurality of gripping elements each having a hub at one end connected to the outermost end region of a respective one of said stub shafts and each further having a generally semicircularly shaped transverse web extending essentially radially inwardly from the respective hub in a plane spaced from the outer face of said front plate, operating means carried by said rear plate and drivingly connected with the innermost end regions of said stub shafts for jointly and codirectionally reciprocally rotating the same about their respective axes, and means responsive to movement of said front plate toward said rear plate for actuating said operating means, whereby upon the pressing of one bead end of a tire carcass against said front plate in surrounding relation to the locus of said hubs, said operating means is actuated to rotate said stub shafts and thereby to shift said gripping elements in an iris-like outward rotary movement so as to bring the arcuate edges of said transverse webs thereof into contact with the interior of said carcass just inside said one bead end thereof while that bead is confined in the space between said webs and said outer face of said front plate.

2. A chuck according to claim 1, said operating means comprising a plurality of pinions secured to said stub shafts, an annular spur gear rotatably carried by said rear plate and in mesh with all of said pinions, and a fluid pressure cylinder carried by said rear plate and having its piston rod articulated to an adjunct of said annular gear.

3. A chuck according to claim 1, further comprising a freely rotatable chuck shaft which at the outermost end thereof carries said rear plate for rotation therewith, a selectively engageable and disengageable clutch arranged on said chuck shaft, means effecting the engagement of said clutch only upon actuation of said gripping elements to secure a carcass to said front plate, drive means for rotating said chuck shaft, and transmission means divingly interconnecting said drive means with a part of said clutch.

4. A chuck according to claim 3, said operating means comprising a plurality of pinions secured to said stub shafts, an annular spur gear rotatably carried by said rear plate radially inwardly of said pinions, said annular gear being in mesh with all of said pinions, and a fluid pressure cylinder carried by said rear plate and having its piston rod articulated to an adjunct of said annular gear.

5. A chuck according to claim 4, said annular gear and the locus of the axes of said stub shafts and pinions being arranged concentrically with said chuck shaft.

References Cited

UNITED STATES PATENTS

| | | | |
|---|---|---|---|
| 2,454,130 | 11/1948 | Braun. | |
| 2,528,873 | 11/1950 | Dorman | 279—2 |
| 2,922,657 | 1/1960 | Garrison et al. | 51—227 X |
| 2,988,913 | 6/1961 | D'Amico | 279—2 X |
| 3,384,048 | 5/1968 | Kutcher | 118—2 |
| 1,917,470 | 7/1933 | Uden | 118—3 |

MORRIS KAPLAN, Primary Examiner

U.S. Cl. X.R.

118—503; 279—2